UNITED STATES PATENT OFFICE.

GEORGE H. CHRISTIAN, OF CLEVELAND, OHIO, ASSIGNOR OF ONE-HALF TO CHARLES HERBERT TAYLOR, OF EAST CLEVELAND, OHIO.

METHOD OF MANUFACTURING PLATES FOR SECONDARY BATTERIES.

SPECIFICATION forming part of Letters Patent No. 708,695, dated September 9, 1902.

Application filed December 7, 1901. Serial No. 85,074. (No specimens.)

*To all whom it may concern:*

Be it known that I, GEORGE H. CHRISTIAN, a citizen of the United States, and a resident of Cleveland, county of Cuyahoga, and State of Ohio, have invented a new and useful Improvement in Methods of Manufacturing Plates for Secondary Batteries, of which the following is a specification, the principle of the invention being herein explained and the best mode in which I have contemplated applying that principle, so as to distinguish it from other inventions.

My invention relates to the manufacture of secondary batteries, and is particularly directed to the preparation of the spongy-lead element of such batteries wherein it is necessary to convert the lead oxid previously formed or existing into spongy lead.

The following description sets forth in detail one mode of carrying out the invention, such disclosed mode constituting but one of various ways in which the principle of the invention may be used. In one method of carrying out such process at present practiced grooved lead plates are suspended as electrodes in an electrolytic bath the electrolyte in which is composed of a solution of sulfuric and nitric acids and ammonium hydrate and then electrolyzed. The resultant electrolytic action effects the dissolution of the lead of the cathode-plates and the formation of a deposit of lead peroxid upon the anode-plates. These peroxid plates are next suspended as electrodes in an electrolytic bath containing an electrolyte composed of dilute sulfuric acid and then electrolyzed, the electrolytic action converting the peroxid upon the negative electrode into spongy lead. This process of deoxidation is slow and tedious, occupying about seventeen days for the size of plate ordinarily used, and must be conducted with care as to the quality of the current used, an improper use of the current or the use of an improper current reducing the efficiency of the resulting plate. In a second method at present practiced plates provided with litharge and red lead are respectively caused to constitute the cathode and anode of an electrolytic cell having an electrolyte consisting of dilute sulfuric acid. The resultant electrolysis deoxidizes the litharge to form spongy lead and changes the red lead to lead peroxid. Instead of conducting such deoxidation in either of the above-described processes in an electrolyte containing sulfuric acid I substitute therefor an electrolyte containing an organic reducing agent, as a solution of an organic acid, such as oxalic or formic, or a compound of such acid with an alkaline earth—such as oxalate of potassium, oxalate of sodium, &c. A solution of oxalic acid and water is preferably used, the oxalic acid being prepared in solution of about one part of acid to eight of water or one pound of acid to one gallon of water, the water used being of a temperature of from 65° to 70° Fahrenheit. The peroxid plates are suspended in such electrolyte so as to form the cathodes, plain lead plates being used for the anodes. Upon the passage of the current, which is preferably of about one-half ampere per square inch of plate-surface, the peroxid is rapidly deoxidized, forming spongy lead, and in the ordinary five-inch by seven-inch plates is completed in about seven to twelve hours. The solution is maintained at the above-named strength during the electrolytic action by continually adding, as is required, crystals of oxalic acid to replace that decomposed by the electrolysis. The plain lead sheets should be about one thirty-second of an inch thickness, of the same width as the peroxid plates, and separated from the latter by hard-rubber strips or bars about one-eighth inch in diameter or one-eighth inch by one-fourth inch to prevent short-circuiting. The spongy-lead plates are then removed from the electrolytic bath, immersed in a bath of running water, and permitted to remain therein for about twelve hours in order to thoroughly remove the carbonic acid formed and oxalic acid remaining in the pores of the lead. The spongy-lead plates are now ready for use in the secondary battery. By this means I have found that spongy-lead plates having superior physical and electrical qualities with less loss of active material are produced, a wider variation in the qualities of the current used being permitted, such plates having a greater electrical capacity per pound of lead than plates heretofore manufactured by other methods.

The results obtained show a marked economical gain in the plate efficiency, where my invention is employed in connection with red lead, litharge, and all other compounds of lead and oxygen other than peroxid.

It is my purpose to make separate application for United States Letters Patent on and specifically claim the method of manufacturing these plates by the use of compounds of organic acids, such as are above mentioned.

Other modes of applying the principle of my invention may be employed instead of the one explained, change being made as regards the process herein disclosed, provided the steps stated by any one of the following claims or the equivalent of such stated steps be employed.

I therefore particularly point out and distinctly claim as my invention—

1. In the process of manufacturing plates for secondary batteries, the step which consists in electrolytically deoxidizing an oxid of lead in an electrolytic cell having an electrolyte containing an organic reducing agent.

2. In the process of manufacturing plates for secondary batteries, the step which consists in electrolytically deoxidizing an oxid of lead in an electrolytic cell having an electrolyte containing an organic acid.

3. In the process of manufacturing plates for secondary batteries, the step which consists in electrolytically deoxidizing an oxid of lead at the cathode of an electrolytic cell having an electrolyte containing an organic acid.

4. The process of converting an oxid of lead into spongy lead, which consists in electrolytically deoxidizing such oxid in an electrolytic cell having an electrolyte containing an organic reducing agent.

5. The process of converting an oxid of lead into spongy lead, which consists in electrolytically deoxidizing such oxid in an electrolytic cell having an electrolyte containing an organic acid.

6. The process of converting an oxid of lead into spongy lead, which consists in electrolytically deoxidizing such oxid in an electrolytic cell having an electrolyte containing oxalic acid.

7. The process of manufacturing spongy-lead plates for secondary batteries, which consists in electrolytically deoxidizing an oxid of lead in an electrolytic bath having an electrolyte containing an organic reducing agent, and strengthening such electrolyte periodically by addition of such agent as electrolysis progresses.

8. The process of manufacturing spongy-lead plates for secondary batteries which consists in electrolytically deoxidizing an oxid of lead in an electrolytic bath having an electrolyte containing an organic acid, and strengthening such electrolyte periodically by addition of such acid as deoxidation progresses.

9. The process of manufacturing spongy-lead plates for secondary batteries which consists in electrolytically deoxidizing an oxid of lead in an electrolytic bath having an electrolyte containing oxalic acid, and strengthening such electrolyte periodically by addition of such acid, as deoxidation progresses.

10. The process of manufacturing spongy lead, which consists in electrolytically deoxidizing lead peroxid in an electrolytic cell having an electrolyte containing an organic reducing agent.

11. The process of manufacturing spongy lead, which consists in electrolytically deoxidizing lead peroxid in an electrolytic cell having an electrolyte containing an organic acid.

12. The process of manufacturing spongy lead, which consists in electrolytically deoxidizing lead peroxid in an electrolytic cell having an electrolyte containing oxalic acid.

13. The step in the process of manufacturing secondary batteries, which consists in the deoxidation of an oxid of lead by means of electrolysis in a bath containing an organic acid.

14. The step in the process of manufacturing secondary batteries, which consists in the deoxidation of an oxid of lead by means of electrolysis in a bath containing oxalic acid.

15. The process of converting an oxid of lead into spongy lead, which consists in electrolytically deoxidizing such oxid in an electrolytic cell having an electrolyte composed of a solution of water and an organic reducing agent.

16. The process of converting an oxid of lead into spongy lead, which consists in electrolytically deoxidizing such oxid in an electrolytic cell having an electrolyte composed of a solution of water and an organic acid.

17. The process of converting an oxid of lead into spongy lead which consists in electrolytically deoxidizing such oxid in an electrolytic cell having an electrolyte composed of a solution of an organic reducing agent.

18. The process of converting an oxid of lead into spongy lead which consists in electrolytically deoxidizing such oxid in an electrolytic cell having an electrolyte composed of a solution of an organic acid.

19. The process of converting an oxid of lead into spongy lead which consists in electrolytically deoxidizing such oxid in an electrolytic cell having an electrolyte composed of a solution of oxalic acid.

20. The process of converting an oxid of lead into spongy lead, which consists in electrolytically deoxidizing such oxid in an electrolytic cell having an electrolyte composed of a solution of water and oxalic acid.

Signed by me this 2d day of December, 1901.

GEO. H. CHRISTIAN.

Attest:
WM. H. TRICKER,
ADELE TRICKER.